United States Patent
Roy (10) Patent No.: US 9,363,174 B2
(45) Date of Patent: Jun. 7, 2016

(54) APPARATUS, METHOD, AND SYSTEM FOR A DESTINATION CACHED ROUTING PROTOCOL FOR MOBILE AD HOC NETWORKS

(71) Applicant: Tanusri Roy, Assam (IN)

(72) Inventor: Tanusri Roy, Assam (IN)

(73) Assignee: Unisys Corporation, Blue Bell, PA (US)

( * ) Notice: Subject to any disclaimer, the term of this patent is extended or adjusted under 35 U.S.C. 154(b) by 69 days.

(21) Appl. No.: 14/177,368

(22) Filed: Feb. 11, 2014

(65) Prior Publication Data

US 2014/0226579 A1    Aug. 14, 2014

(51) Int. Cl.
*G06F 11/00*    (2006.01)
*H04L 12/721*   (2013.01)
*H04W 40/02*    (2009.01)

(52) U.S. Cl.
CPC .............. *H04L 45/72* (2013.01); *H04W 40/02* (2013.01)

(58) Field of Classification Search
CPC ...... H04L 45/72; H04L 12/721; H04W 40/02
USPC ............ 370/218, 229, 230, 231, 235, 237, 370/241.1, 242, 252, 254, 285, 338, 351, 370/355, 356
See application file for complete search history.

(56) References Cited

U.S. PATENT DOCUMENTS

| | | | |
|---|---|---|---|
| 6,535,498 B1 * | 3/2003 | Larsson et al. | 370/338 |
| 6,704,293 B1 * | 3/2004 | Larsson et al. | 370/255 |

* cited by examiner

*Primary Examiner* — Mang Yeung
(74) *Attorney, Agent, or Firm* — Richard J. Gregson (57) ABSTRACT

An apparatus, system and method are disclosed for a destination cached routing protocol for data transmission among a plurality of nodes in a mobile ad hoc network. When a routing request is received, an intermediate node transmits a received routing request message to neighboring nodes, and appends its address to and forwards the routing request packet only to other nodes from which a received routing request message was not received during a first predetermined period of time. When a route reply packet is received, the designated data transmission route is stored in memory as a cached data transmission route to the destination node, and a cached route message is transmitted to neighboring nodes, which also store the data transmission route. Upon a link failure, alternative data transmission routes are stored in memory and may be utilized to continue data transmission without additional route discovery.

28 Claims, 8 Drawing Sheets

APPARATUS, METHOD, AND SYSTEM FOR A DESTINATION CACHED ROUTING PROTOCOL FOR MOBILE AD HOC NETWORKS

BACKGROUND OF THE INVENTION

1. Field of the Invention

The present invention generally relates to data packet routing for a mobile ad hoc network, and more particularly, relates to an apparatus, method and system for a destination cached routing protocol for mobile ad hoc networks.

2. Description of the Prior Art

Mobile ad hoc networks may be utilized to form an internet or other network of "things", in any given period of time and at any given location, and has no fixed topology and generally no fixed infrastructure. A mobile ad hoc network may be located anywhere, such as an airport waiting lounge, a subway station, a train car, an airplane, a restaurant, a store, a parking lot, a coffee shop, a night club, a theatre, a hotel lobby, etc. A mobile ad hoc network may be comprised of any type of mobile devices, typically referred to as nodes, and the composition of any such mobile ad hoc network is typically fluid and changing over time, as mobile devices enter or leave a mobile ad hoc network.

Mobile ad hoc networks typically transmit data between and among the various mobile nodes (devices) as data packets. In such a mobile ad hoc network, any mobile device may function as a host and also as a router, to not only receive and transmit data packets as a destination node or a source node, but also to act as an intermediate node and route data packets received from another, second device to a third device in the mobile ad hoc network.

Various problems exist in prior art routing protocols for such mobile ad hoc networks. When a source node has to transfer data to a destination node, a route discovery process commences, initiated by the source node, with Route Request ("RREQ") packets being broadcast in the mobile ad hoc network. As the packet propagates in the network and is received by a plurality of nodes, each (intermediate) node adds its address into the RREQ packet and continues to broadcast the RREQ packet to successive nodes, until either the destination (or target) of the RREQ packet is found, or until another intermediate node is found that can supply a route to the destination. As a result, the RREQ packets grow in size, and such large packets tend to create congestion and delay in the network. In addition, breaking the larger RREQ packet into two or more smaller packets may cause corrupted data and/or dropped data, with subsequent retransmission further serving to increase congestion. A node may also receive many RREQ packets, which can lead to congestion in the node and loss of a data packet or a RREQ packet, thereby reducing reliability of the network.

Similarly, a destination node generates a Route Reply ("RREP") packet for each received RREQ packet. The route included in the RREP packet is obtained by reversing the route that is specified in the RREQ packet. As the RREP packet moves following this route through intermediate nodes to the source node, the nodes receiving the RREP packet caches or otherwise saves the route from its address to the destination. The source node may receive many RREP packets, affording many alternative routes to reach the destination node. The data packet from the source node is then forwarded to the destination node via the minimum hop route, typically via these various intermediate nodes. If any data transfer link is broken in between the source and destination, such as by a device leaving the mobile ad hoc network, an intermediate node generates and forwards a Route Error ("RERR") packet to the neighboring nodes, destined for the source node. Upon receiving a RERR packet, each node erases or otherwise removes the route containing the non-functioning link. Upon receiving such a RERR packet, the source node may attempt to retransmit the data packet using another route to the destination node which it may have cached from previous route discovery sessions, or can start another route discovery session to find a new route to the destination nodes. As a result of such repetition, network congestion is further increased, wasting time and increasing the overhead cost of the mobile ad hoc network.

Accordingly, a need remains for a system, apparatus and method for an on-demand routing protocol for a mobile ad hoc network which reduces the potential for such network congestion. Such a system, apparatus, method and software for such a routing protocol should also be reasonably scalable, reliable, and efficient, thereby reducing routing overhead and reducing the likelihood of dropped or corrupted data packets.

SUMMARY OF THE INVENTION

Particular representative or exemplary embodiments of the subject matter described in this specification may be implemented to provide or realize numerous advantages. Exemplary embodiments of the apparatus, method and system of the present disclosure provide a destination cached routing protocol for a mobile ad hoc network which reduces the potential for network congestion. The destination cached routing protocol is also reasonably scalable, reliable, and efficient, thereby reducing routing overhead and reducing the likelihood of dropped or corrupted data packets. The destination cached routing protocol of the present disclosure further allows for ongoing data transmission in the event of a link failure, without undergoing an additional route discovery process, further reducing network congestion. This is especially significant as a mobile ad hoc network is highly dynamic, with nodes entering and leaving the network with reasonably frequency, while nonetheless allowing for ongoing data transmission without loss.

An exemplary or representative method embodiment for a destination cached routing protocol for data transmission in a mobile ad hoc network is disclosed, with the method performed by a plurality of data processing apparatus as a plurality of nodes of the mobile ad hoc network. An exemplary or representative method embodiment comprises: using a source node, transmitting a routing request packet for a data transmission route from the source node to a destination node of the plurality of nodes; when a routing request is received, using an intermediate node of the plurality of nodes, transmitting a received routing request message to neighboring nodes of the plurality of nodes; using the intermediate node, appending the intermediate node address to the routing request packet and forwarding the routing request packet only to other nodes, of the plurality of nodes, from which a received routing request message was not received during a first predetermined period of time; using a destination node, for each route request packet received by the destination node, transmitting a route reply packet having a designated data transmission route between the source node and the destination node; and transmitting a data packet, the data packet having the designated data transmission route in a packet header. In an exemplary or representative embodiment, the received routing request message is smaller than the routing request packet.

An exemplary or representative method embodiment may further comprise: using a first intermediate node of the plurality of nodes, receiving at least one route reply packet; and storing the designated data transmission route in a memory of the first intermediate node as a cached first data transmission route from the first intermediate node to the destination node. An exemplary or representative method embodiment may further comprise: using the first intermediate node, transmitting a cached route message to neighboring nodes of the plurality of nodes, the cached route message designating the first data transmission route from the first intermediate node to the destination node.

Another exemplary or representative method embodiment may further comprise: using a second intermediate node of the plurality of nodes, receiving the cached route message from the first intermediate node; and storing the first data transmission route in a memory of the second intermediate node as a cached first data transmission route, from the first intermediate node to the destination node, of a plurality of cached data transmission routes to the destination node via a corresponding plurality of intermediate nodes of the plurality of nodes.

An exemplary or representative method embodiment may further comprise: using the first intermediate node of the plurality of nodes, transmitting a data packet to a third intermediate node of the plurality of nodes, the third intermediate node designated in the first data transmission route; when an acknowledgement message is not received from the third intermediate node, using the first intermediate node, transmitting a route error message; and using the first intermediate node, searching the memory of the first intermediate node for a second data transmission route, of the plurality of cached data transmission routes, to the destination node via a neighboring node of the plurality of nodes. Such an exemplary or representative method embodiment may further comprise: appending the second data transmission route to the data packet; and retransmitting the data packet having the second data transmission route in the packet header.

In an exemplary or representative method embodiment, using the destination node, when a data packet is received having the second data transmission route in the packet header, the exemplary or representative method may further comprise broadcasting a data message with the second data transmission route. For each intermediate node of the plurality of nodes, when a data message having the second data transmission route is received, the exemplary or representative method may further comprise removing the first data transmission route from a memory of the intermediate node, and storing the second data transmission route as a cached second data transmission route of the plurality of cached data transmission routes.

Another exemplary or representative method embodiment may further comprise: using an intermediate node, when a route error message is received, transmitting an error message to neighboring nodes; and using the intermediate node, forwarding the route error message only to other nodes, of the plurality of nodes, from which an error message was not received during a second predetermined period of time. In an exemplary or representative embodiment, the error message is smaller than the route error message.

Another exemplary or representative method embodiment may further comprise: using the source node, receiving a plurality of route reply packets; and selecting a first designated data transmission route from the source node to the destination node, the first designated data transmission route having the fewest number of intermediate nodes of the plurality of nodes.

In an exemplary or representative method embodiment, upon entry into the mobile ad hoc network, the exemplary or representative method may further comprise broadcasting a node address message to the plurality of nodes; when a node address is received, transmitting at least one cached route message to the node designated in the node address message; and when at least one cached route message is received, storing the corresponding data transmission route in a memory as a cached data transmission route of the plurality of cached data transmission routes to the destination node.

An exemplary or representative data processing apparatus for destination cached routing protocol for data transmission in a mobile ad hoc network is also disclosed, in which the mobile ad hoc network is comprised of a plurality of data processing apparatus as a plurality of nodes of the mobile ad hoc network. An exemplary or representative data processing apparatus embodiment comprises: a network input and output interface to receive and transmit data; a memory to store data; and one or more processors to transmit a routing request packet for a data transmission route from a source node to a destination node of the plurality of nodes; when operating as an intermediate node of the plurality of nodes and a routing request is received, to transmit a received routing request message to neighboring nodes of the plurality of nodes, to append the intermediate node address to the routing request packet and forward the routing request packet only to other nodes, of the plurality of nodes, from which a received routing request message was not received during a first predetermined period of time; when operating as the destination node of the plurality of nodes and a route request packet is received, for each route request packet, to transmit a route reply packet having a designated data transmission route between the source node and the destination node; and to transmit a data packet, the data packet having the designated data transmission route in a packet header.

In an exemplary or representative data processing apparatus embodiment, the one or more processors, when operating as a first intermediate node of the plurality of nodes and at least one route reply packet is received, further may store the designated data transmission route in the memory as a cached first data transmission route from the first intermediate node to the destination node; and may transmit a cached route message to neighboring nodes of the plurality of nodes, the cached route message designating the first data transmission route from the first intermediate node to the destination node. In an exemplary or representative data processing apparatus embodiment, the one or more processors, when operating as a second intermediate node of the plurality of nodes and the cached route message from the first intermediate node is received, further may store the first data transmission route in a memory as a cached first data transmission route, from the first intermediate node to the destination node, of a plurality of cached data transmission routes to the destination node via a corresponding plurality of intermediate nodes of the plurality of nodes.

In an exemplary or representative data processing apparatus embodiment, the one or more processors, when operating as the first intermediate node of the plurality of nodes, further may transmit a data packet to a third intermediate node of the plurality of nodes, the third intermediate node designated in the first data transmission route; when an acknowledgement message is not received from the third intermediate node, may transmit a route error message; and may search the memory for a second data transmission route, of the plurality of cached data transmission routes, to the destination node via a neighboring node of the plurality of nodes. In an exemplary or representative data processing apparatus embodiment, the one or more processors further may append the second data transmission route to the data packet and retransmit the data packet having the second data transmission route in the packet header.

In another exemplary or representative data processing apparatus embodiment, the one or more processors, when operating as the destination node and a data packet is received having the second data transmission route in the packet header, further may broadcast a data message with the second data transmission route. In an exemplary or representative data processing apparatus embodiment, the one or more processors, when operating as an intermediate node of the plurality of nodes and a data message having the second data transmission route is received, further may remove the first data transmission route from the memory, and store the second data transmission route as a cached second data transmission route of the plurality of cached data transmission routes.

In an exemplary or representative data processing apparatus embodiment, the one or more processors, when operating as an intermediate node of the plurality of nodes and a route error message is received, further may transmit an error message to neighboring nodes of the plurality of nodes; and may forward the route error message only to other nodes, of the plurality of nodes, from which an error message was not received during a second predetermined period of time. In an exemplary or representative embodiment, the error message is smaller than the route error message.

In an exemplary or representative data processing apparatus embodiment, the one or more processors, when operating as the source node and a plurality of route reply packets are received, further may select a first designated data transmission route to the destination node, the first designated data transmission route having the fewest number of intermediate nodes of the plurality of nodes.

In another exemplary or representative data processing apparatus embodiment, the one or more processors, upon entry into the mobile ad hoc network, further may broadcast a node address message to the plurality of nodes; and when a node address is received, may transmit at least one cached route message to the node designated in the node address message. In an exemplary or representative data processing apparatus embodiment, the one or more processors, when at least one cached route message is received, further may store the corresponding data transmission route in the memory as a cached data transmission route of the plurality of cached data transmission routes to the destination node.

An exemplary or representative non-transitory, tangible medium storing machine-readable instructions is disclosed, for execution by a data processing apparatus for a destination cached routing protocol for data transmission in a mobile ad hoc network, the mobile ad hoc network comprised of a plurality of data processing apparatus as a plurality of nodes of the mobile ad hoc network, with the non-transitory, tangible medium comprising one or more of the following program modules:

a first program module to transmit a routing request packet for a data transmission route from a source node to a destination node of the plurality of nodes;

a second program module, when operating as an intermediate node of the plurality of nodes and in response to receiving a routing request, to transmit a received routing request message to neighboring nodes of the plurality of nodes, to append the intermediate node address to the routing request packet and forward the routing request packet only to other nodes, of the plurality of nodes, from which a received routing request message was not received during a first predetermined period of time;

a third program module, when operating as the destination node of the plurality of nodes and in response to receiving a route request packet, for each route request packet, to transmit a route reply packet having a designated data transmission route between the source node and the destination node;

a fourth program module to transmit a data packet, the data packet having the designated data transmission route in a packet header, a fifth program module, when operating as a first intermediate node of the plurality of nodes and in response to receiving at least one route reply packet, to store the designated data transmission route in a memory as a cached first data transmission route from the first intermediate node to the destination node;

a sixth program module to transmit a cached route message to neighboring nodes of the plurality of nodes, the cached route message designating the first data transmission route from the first intermediate node to the destination node;

a seventh program module, when operating as a second intermediate node of the plurality of nodes and in response to receiving the cached route message from the first intermediate node, to store the first data transmission route in the memory as a cached first data transmission route, from the first intermediate node to the destination node, of a plurality of cached data transmission routes to the destination node via a corresponding plurality of intermediate nodes of the plurality of nodes;

an eighth program module, when operating as the first intermediate node of the plurality of nodes, to transmit a data packet to a third intermediate node of the plurality of nodes, the third intermediate node designated in the first data transmission route; when an acknowledgement message is not received from the third intermediate node, to transmit a route error message; and to search the memory for a second data transmission route, of the plurality of cached data transmission routes, to the destination node via a neighboring node of the plurality of nodes;

a ninth program module to append the second data transmission route to the data packet and retransmit the data packet having the second data transmission route in the packet header, a tenth program module, when operating as the destination node and in response to receiving a data packet having the second data transmission route in the packet header, to broadcast a data message with the second data transmission route;

an eleventh program module, when operating as an intermediate node of the plurality of nodes and in response to receiving a data message having the second data transmission route, to remove the first data transmission route from the memory, and store the second data transmission route as a cached second data transmission route of the plurality of cached data transmission routes;

a twelfth program module, when operating as an intermediate node of the plurality of nodes and in response to receiving a route error message, to transmit an error message to neighboring nodes of the plurality of nodes; and to forward the route error message only to other nodes, of the plurality of nodes, from which an error message was not received during a second predetermined period of time;

a thirteenth program module, when operating as the source node and in response to receiving a plurality of route reply packets, to select a first designated data transmission route to the destination node, the first designated data transmission route having the fewest number of intermediate nodes of the plurality of nodes;

a fourteenth program module, upon entry into the mobile ad hoc network, to broadcast a node address message to the plurality of nodes, and in response to receiving a node address, to transmit at least one cached route message to the node designated in the node address message; and/or a fifteenth program module, in response to receiving at least one cached route message, to store the corresponding data transmission route in a memory as a cached data transmission route of the plurality of cached data transmission routes to the destination node.

Numerous other advantages and features of the present disclosure will become readily apparent from the following detailed description of the subject matter described in this specification and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which:

FIG. 3, divided into

FIG. 4, divided into

DETAILED DESCRIPTION OF REPRESENTATIVE EMBODIMENTS

While the present invention is susceptible of embodiment in many different forms, there are shown in the drawings and will be described herein in detail specific exemplary embodiments thereof, with the understanding that the present disclosure is to be considered as an exemplification of the principles of the invention and is not intended to limit the invention to the specific embodiments illustrated. In this respect, before explaining at least one embodiment consistent with the present invention in detail, it is to be understood that the invention is not limited in its application to the details of construction and to the arrangements of components set forth above and below, illustrated in the drawings, or as described in the examples. Methods and apparatuses consistent with the present invention are capable of other embodiments and of being practiced and carried out in various ways. Also, it is to be understood that the phraseology and terminology employed herein, as well as the abstract included below, are for the purposes of description and should not be regarded as limiting.

As mentioned above, the destination cached routing protocol of the present disclosure provides for an on-demand routing protocol for a mobile ad hoc network which reduces the potential for such network congestion. The destination cached routing protocol is also reasonably scalable, reliable, and efficient, thereby reducing routing overhead and reducing the likelihood of dropped or corrupted data packets. The destination cached routing protocol of the present disclosure further allows for ongoing data transmission in the event of a link failure, without undergoing an additional route discovery process, further reducing network congestion. This is especially significant as a mobile ad hoc network is highly dynamic, with nodes entering and leaving the network with reasonably frequency, while nonetheless allowing for ongoing data transmission without loss. The destination cached routing protocol for mobile ad hoc networks may be utilized in or by system 100 and/or apparatus 200 embodiments (illustrated in FIGS. 1 and 2 and described in greater detail below) in a plurality of ways to perform the data transmission functionality for a mobile ad hoc network 175 of the present disclosure.

Figure 1:
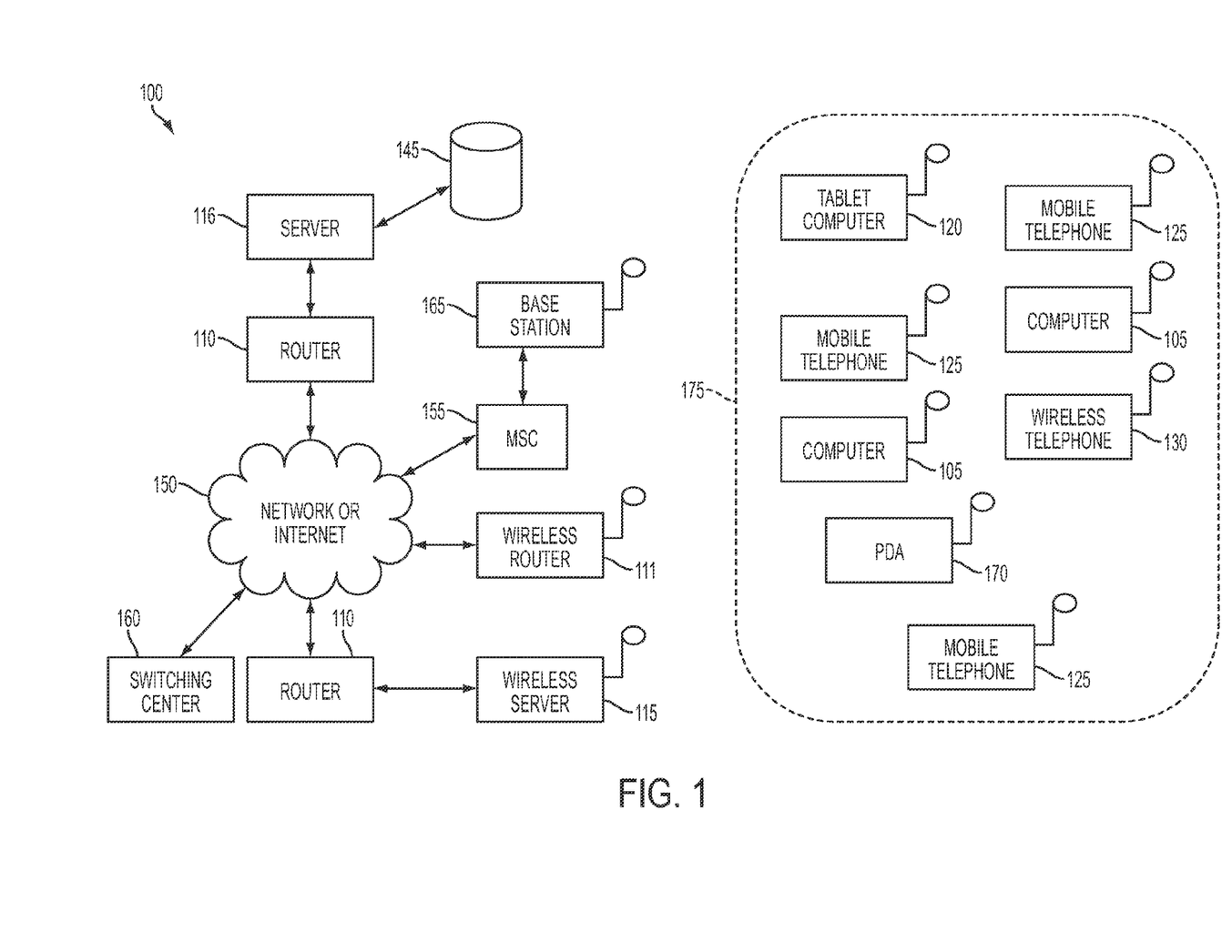
FIG. 1 is a block diagram illustrating an exemplary or representative system for a destination cached routing protocol for mobile ad hoc networks.
Figure 2:
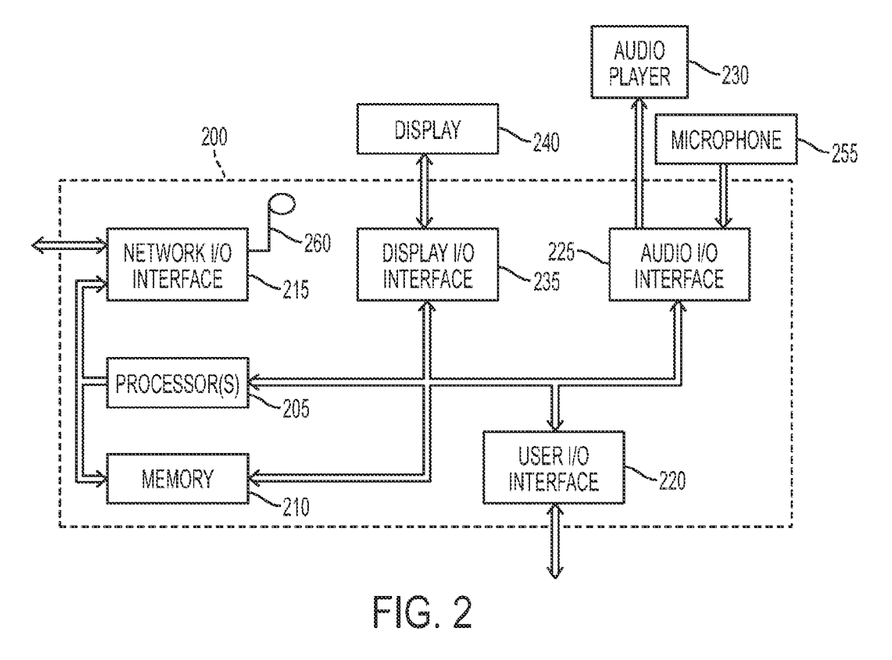
FIG. 2 is a block diagram illustrating an exemplary or representative apparatus for a destination cached routing protocol for mobile ad hoc networks.

FIG. 1 is a block diagram illustrating an exemplary or representative system 100 for a destination cached routing protocol for a mobile ad hoc network 175. FIG. 2 is a block diagram illustrating an exemplary or representative apparatus 200 for a destination cached routing protocol for a mobile ad hoc network. Such an apparatus 200 may be equivalently referred to as a system, such as when embodied as a computer 105 or server 115, and claimed as such. The operations described in this specification may be implemented as operations performed by a data processing apparatus, such as an apparatus 200, on data stored on one or more computer-readable storage devices or received from other sources.

Referring to FIG. 1, as illustrated, the exemplary system 100 (and/or data processing apparatus 200) may be implemented or embodied in a plurality of ways such as, for example and without limitation, within a single data processing apparatus or among a plurality of networked data processing apparatus, such as within a computer 105, a (wireless) server 115, a tablet computer (or computing device) 120, a mobile (e.g., cellular) telephone or smartphone 125, other types of mobile devices such as mobile telephone 130, a personal digital assistant (PDA) 170, or any other type of data processing apparatus. As a consequence, any of these various data processing apparatus are referred to as a "node" herein, such as a source node having data for transmission over a mobile ad hoc network 175, a destination node to receive data from a source node in the mobile ad hoc network 175, and one or more intermediate nodes which transfers data between and among a source node, other intermediate nodes, and a destination node.

As mentioned above, a mobile ad hoc network 175 may be located anywhere, such as an airport waiting lounge, a subway station, a train car, an airplane, a restaurant, a store, a parking lot, a coffee shop, a night club, a theatre, a hotel lobby, and so on. A mobile ad hoc network 175 may be comprised of any of a plurality of any of these various mobile devices, and the composition of any such mobile ad hoc network 175 is typically fluid and changing over time, as mobile devices enter or leave a mobile ad hoc network 175. For example, during a first time interval, the mobile ad hoc network 175 may be comprised of a plurality of tablet computers 120, mobile telephones 125 and mobile computers 105. Continuing with the example, during a second, later time interval, the mobile ad hoc network 175 may be comprised of a plurality of tablet computers 120, mobile telephones 125, mobile computers 105, and PDAs 170. Also continuing with the example, during a third, further later time interval, the mobile ad hoc network 175 may be comprised of a plurality mobile telephones 125 and mobile computers 105. Any of these various devices forming the mobile ad hoc network 175, therefore, are referred to as nodes, and any of which may be source, destination, and/or intermediate nodes.

As discussed in greater detail below with reference to FIGS. 3 and 4, the destination cached routing protocol for mobile ad hoc networks may be divided into route discovery (with data transmission) and route maintenance, all designed to reduce packet congestion, reduce dropped or lost data packets, and reduce additional route discovery when a node (or link) drops out of the mobile ad hoc network 175. As described in greater detail below, as various route request (RREQ) packets and route reply (RREP) packets are transmitted, one or more data routes may be established between source and destination nodes, via one or more intermediate nodes. Each of these various routes are cached in neighboring nodes (e.g., in a memory 210, illustrated in FIG. 2), with any of them being available for routing alternatives if or when a node leaves the mobile ad hoc network 175 (or a data transmission link is otherwise broken), thereby reducing the need for subsequent, additional route discovery procedures and reducing the potential for lost data packets. In addition, various additional, comparatively short messages are utilized, to reduce transmission of comparatively longer messages (such as RREQ packets), and thereby further reduces network congestion. Each of these features is described in greater detail below.

Data transmission may occur solely within the mobile ad hoc network 175, such as when both source and destination nodes are devices within the mobile ad hoc network 175. In addition, as illustrated in FIG. 1, any one of these devices (such as mobile telephones (smartphones) 125 and wireless router 111) also may be coupled, such as through a base station 165 (via mobile switching center ("MSC") 155), other switching center 160, and/or wireless router 111, to another network, such as network or internet 150, which in turn may provide communication to many other networked devices, as illustrated, using any protocol, in addition to the destination cached routing protocol for mobile ad hoc networks 175 utilized between and among the various mobile devices. For example and without limitation, depending upon the selected embodiment, any of these various other devices potentially may also function as source or destination nodes of a first mobile ad hoc network 175, and further may provide network connections to or from a second mobile ad hoc network 175 in a different location, also for example. As another example, a mobile telephone (such as a smartphone) 125 may function as a first destination node for a first source node of a first mobile ad hoc network 175 using the destination cached routing protocol for mobile ad hoc networks of the present disclosure, and then further transmit the received data (via base station 165 and MSC 155) using a different protocol over network or internet 150, which is then further transmitted by a second source node to a second destination node in a second mobile ad hoc network 175, also using the destination cached routing protocol for mobile ad hoc networks of the present disclosure.

Continuing to refer to FIG. 1, as illustrated, the exemplary network 150 may be of any type of kind, using any medium such as wired, optical, or wireless, using any current or future protocols, such as Internet Protocol ("IP"), Transmission Control Protocol ("TCP") (collectively with IP referred to as "TCP/IP"), which may further incorporate other current or future protocols, such as hypertext transfer protocol ("HTTP"), various email and file transfer protocols (e.g., SMTP, FTP), or other types of networks, such as the public switched telephone network ("PSTN"), cellular, GSM, EDGE, GPRS, Institute of Electrical and Electronic Engineers ("IEEE") 802.11, CDMA, WCDMA, 3G, 4G, or any other network which provides for communication for data, voice or multimedia, for user input, selection, evaluation, reporting, media provision, and so on. The network 150, in turn, may be utilized to provide any type of communication between and among the other illustrated devices, and may be directly or indirectly coupled to any of a plurality of other devices for such internet, voice, multimedia or any other form of data communication, whether switched or routed, including without limitation router(s) 110, wireless router(s) 111, and server(s) 115, 116 of any type or kind (and which may be further coupled to database(s) 145), mobile switching centers (MSCs) 155, other switching centers 160, and wireless base station(s) 165. The components of the system can be interconnected by any form or medium of digital data communication, such as the illustrated network or internet 150 as a representative communication network (e.g., a local area network ("LAN") and a wide area network ("WAN"), an internetwork such as the Internet, and/or a peer-to-peer network. The apparatus 200 described below and the execution environment of system 100 and/or apparatus 200 may utilize various different computing model infrastructures, such as web services, distributed computing and grid computing infrastructures, for example and without limitation.

FIG. 2 is a block diagram illustrating an exemplary or representative apparatus 200 for a destination cached routing protocol for mobile ad hoc networks. Such an apparatus 200 may be equivalently referred to as a system, such as when embodied as a computer 105 or server 115, 116, and claimed as such. Referring to FIG. 2, the exemplary apparatus 200 comprises one or more processor(s) 205, a network input/output ("I/O") interface 215, and a memory 210 (which also may include one or more databases). Depending upon the selected embodiment, such as whether embodied in a computer 105 or a server 115, the apparatus 200 may also include optional components such as a user input/output ("I/O") interface 220 (such as for coupling to a keyboard, computer mouse, or other user input device, not separately illustrated), an audio input/output interface 225 (e.g., for coupling to a microphone 255, to audio speakers or other audio player 230, such as for voice-to-voice translation), a display interface or controller 235, and may also include a display 240, such as an LCD screen or mobile smartphone touch screen. For example, server 115, 116 embodiments typically may not include these optional components; conversely, various computer 105 embodiments are likely to include all of such optional components. The processor(s) 205, network input/output ("I/O") interface 215, memory 210, user input/output ("I/O") interface 220, audio input/output interface 225, audio player 230, display interface or controller 235, and display 240, may be implemented or embodied as known or becomes known in the electronic arts, with various examples described in greater detail below. In addition, multiple apparatuses 200 may be utilized in a system 100, such as a first apparatus 200 as a client device and a second apparatus 200 as a server 115, for example and without limitation.

A representative network I/O interface 215 typically comprises a data transmitter and a data receiver (not separately illustrated) which are typically coupled to an antenna 260, which may be implemented for any selected type of wireless communication with any other data processing apparatus, at selected power levels, using any selected frequency band or range, and using any selected type of communication protocol, in addition to a destination cached routing protocol for mobile ad hoc networks of the present disclosure, as described above. The network I/O interface 215 performs the various data transmission and reception functionality of the present disclosure, under the control of the processor (or controller) 205 and using memory 210, such as for data packet transmission of any data which is stored in memory 210, or to store received data in memory 210, or to store various addresses and protocol routes in memory 210, for example and without limitation.

A processor 205 may be implemented using any type of digital or analog electronic or other circuitry which is arranged, configured, designed, programmed or otherwise adapted to perform any portion of the destination cached routing protocol functionality for mobile ad hoc networks of the present disclosure. As the term processor is used herein, a processor 205 may include use of a single integrated circuit ("IC"), or may include use of a plurality of integrated circuits or other electronic components connected, arranged or grouped together, such as processors, controllers, microprocessors, digital signal processors ("DSPs"), parallel processors, multiple core processors, custom ICs, application specific integrated circuits ("ASICs"), field programmable gate arrays ("FPGAs"), adaptive computing ICs, discrete electronic components, and any associated memory (such as RAM, DRAM and ROM), and other ICs and components, whether analog or digital. As a consequence, as used herein, the term processor should be understood to equivalently mean and include a single IC, or arrangement of custom ICs, ASICs, processors, microprocessors, controllers, FPGAs, adaptive computing ICs, or some other grouping of integrated circuits or discrete electronic components which perform the functions discussed above and further discussed below, and may further include any associated memory, such as microprocessor memory or additional RAM, DRAM, SDRAM, SRAM, MRAM, ROM, FLASH, EPROM or $E^2$PROM. A processor (such as processor 205), with any associated memory, may be arranged, adapted or configured (via programming, FPGA interconnection, or hard-wiring) to perform any portion of the destination cached routing protocol functionality for mobile ad hoc networks of the present disclosure, as described herein. For example, the methodology may be programmed and stored, in a processor 205 with its associated memory (and/or memory 210) and other equivalent components, as a set of program instructions or other code (or equivalent configuration or other program) for subsequent execution when the processor 205 is operative (i.e., powered on and functioning). Equivalently, when the processor 205 may implemented in whole or part as FPGAs, custom ICs and/or ASICs, the FPGAs, custom ICs or ASICs also may be designed, configured and/or hard-wired to implement any portion of the destination cached routing protocol functionality for mobile ad hoc networks of the present disclosure. For example, the processor 205 may be implemented as an arrangement of analog and/or digital circuits, controllers, microprocessors, DSPs and/or ASICs, collectively referred to as a "processor", which are respectively hard-wired, arranged, programmed, designed, adapted or configured to implement a destination cached routing protocol functionality for mobile ad hoc networks of the present disclosure, including possibly in conjunction with a memory 210.

The operations described in this disclosure can be implemented as operations performed by a data processing apparatus on data stored on one or more machine-readable storage devices or on data received from other sources. Apparatus 200 is an example of a representative data processing apparatus. As utilized herein, the terminology "data processing apparatus" encompasses any and all kinds of apparatus, devices, and machines for processing data, including by way of example a programmable processor (205), a computer 105, a server 115, a system on a chip ("SOC"), a mobile telephone 125 (e.g., a smartphone), a tablet computer 120, a PDA 170, a wireless router 111, or combinations of such devices. The apparatus 200 can also include code (such as executable code) that creates an execution environment for a data processing apparatus, or other program, such as processor 205 firmware, a protocol stack, a database (145) management system, an operating system, a cross-platform runtime environment, a virtual machine, and/or combinations thereof, which may be utilized in a computer 105, a server 115, or other data processing apparatus.

A memory 210 may be embodied as any type of data storage device, such as RAM, FLASH, DRAM, SDRAM, SRAM, MRAM, FeRAM, ROM, EPROM or $E^2$PROM, and is utilized for data storage, and also may be utilized to store any program instructions or configurations which may be utilized by a processor 205. More specifically, the memory 210 may be embodied in any number of forms, including within any nontransitory, machine-readable data storage medium, memory device or other storage or communication device for storage or communication of information, currently known or which becomes available in the future, including, but not limited to, a memory integrated circuit ("IC"), or memory portion of an integrated circuit (such as the resident memory within a processor 205 or processor IC), whether volatile or non-volatile, whether removable or non-removable, including without limitation RAM, FLASH, DRAM, SDRAM, SRAM, MRAM, FeRAM, ROM, EPROM or $E^2$PROM, or any other form of memory device, such as a magnetic hard drive, an optical drive, a magnetic disk or tape drive, a hard disk drive, other machine-readable storage or memory media such as a floppy disk, a CDROM, a CD-RW, digital versatile disk (DVD) or other optical memory, or any other type of memory, storage medium, or data storage apparatus or circuit, which is known or which becomes known, depending upon the selected embodiment. The memory 210 may store data in any way or configuration, including as various look up tables, parameters, coefficients, databases, other information and data, programs or instructions, and other types of tables such as database tables or any other form of data repository.

As indicated above, the processor 205 is hard-wired, configured or programmed, using software and data structures of the invention, for example, to perform any portion of the destination cached routing protocol functionality for mobile ad hoc networks of the present disclosure. As a consequence, the system and method of the present disclosure may be embodied as software which provides such programming or other instructions, such as a set of instructions and/or metadata embodied within a nontransitory computer-readable medium, discussed above. In addition, metadata may also be utilized to define the various data structures of a look up table or a database. Such software may be in the form of source or object code, by way of example and without limitation. Source code further may be compiled into some form of instructions or object code (including assembly language instructions or configuration information). The software, source code or metadata of the present invention may be embodied as any type of code, such as C, C++, Javascript, Adobe Flash, Silverlight, SystemC, LISA, XML, Java, Brew, SQL and its variations (e.g., SQL 99 or proprietary versions of SQL), DB2, Oracle, or any other type of programming language which performs the functionality discussed herein, including various hardware definition or hardware modeling languages (e.g., Verilog, VHDL, RTL) and resulting database files (e.g., GDSII). As a consequence, "software", "program", "computer program", or a "module", "program module", "software module", as used equivalently herein, means and refers to any programming language, of any kind, with any syntax or signatures, which provides or can be interpreted to provide the associated functionality or methodology specified (when instantiated or loaded into a processor or computer and executed, including the processor 205, for example). In addition, any of such program or software modules may be combined or divided in any way. For example, a larger module combining first and second functions is considered equivalent to a first module which performs the first function and a separate second module which performs the second function.

For example, a computer program (e.g., a program, software, software application, script, or code) can be written in any form of programming language, including compiled, interpreted, declarative, or procedural languages. Such a program may be implemented in any form, including as a stand-alone program or as a module, component, subroutine, object, or other construct which may be used in a computing environment, and may be stored as a file, a file system, multiple files, or portion of a file which includes other programs or data, such as a script stored in a markup language document, and may be executed on one or more computers 105, servers 115, or other data processing apparatus that are co-located or distributed across multiple locations and interconnected by a network such as network or internet 150.

The software, metadata, or other source code of the present invention and any resulting bit file (object code, database, or look up table) may be embodied within any tangible, non-transitory storage medium, such as any of the computer or other machine-readable data storage media, as computer-readable instructions, data structures, program modules or other data, such as discussed above with respect to the memory 210, e.g., a memory IC, a floppy disk, a CDROM, a CD-RW, a DVD, a magnetic hard drive, an optical drive, or any other type of data storage apparatus or medium, as mentioned above.

Figure 3A:
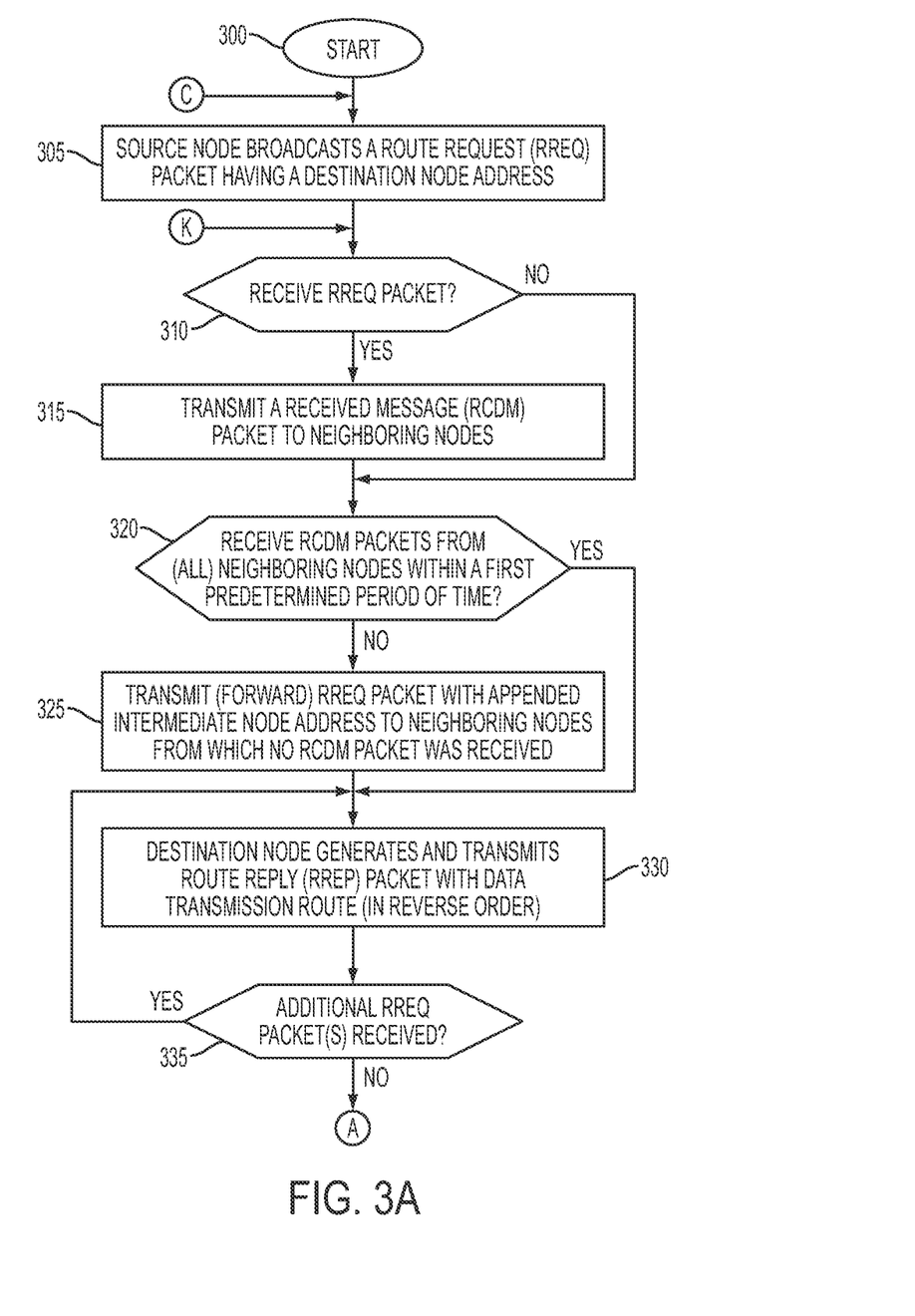
FIG. 3A, FIG. 3B, and FIG. 3C, is a flow chart diagram illustrating an exemplary or representative method for route discovery and data communication for a destination cached routing protocol for mobile ad hoc networks.
Figure 3B:
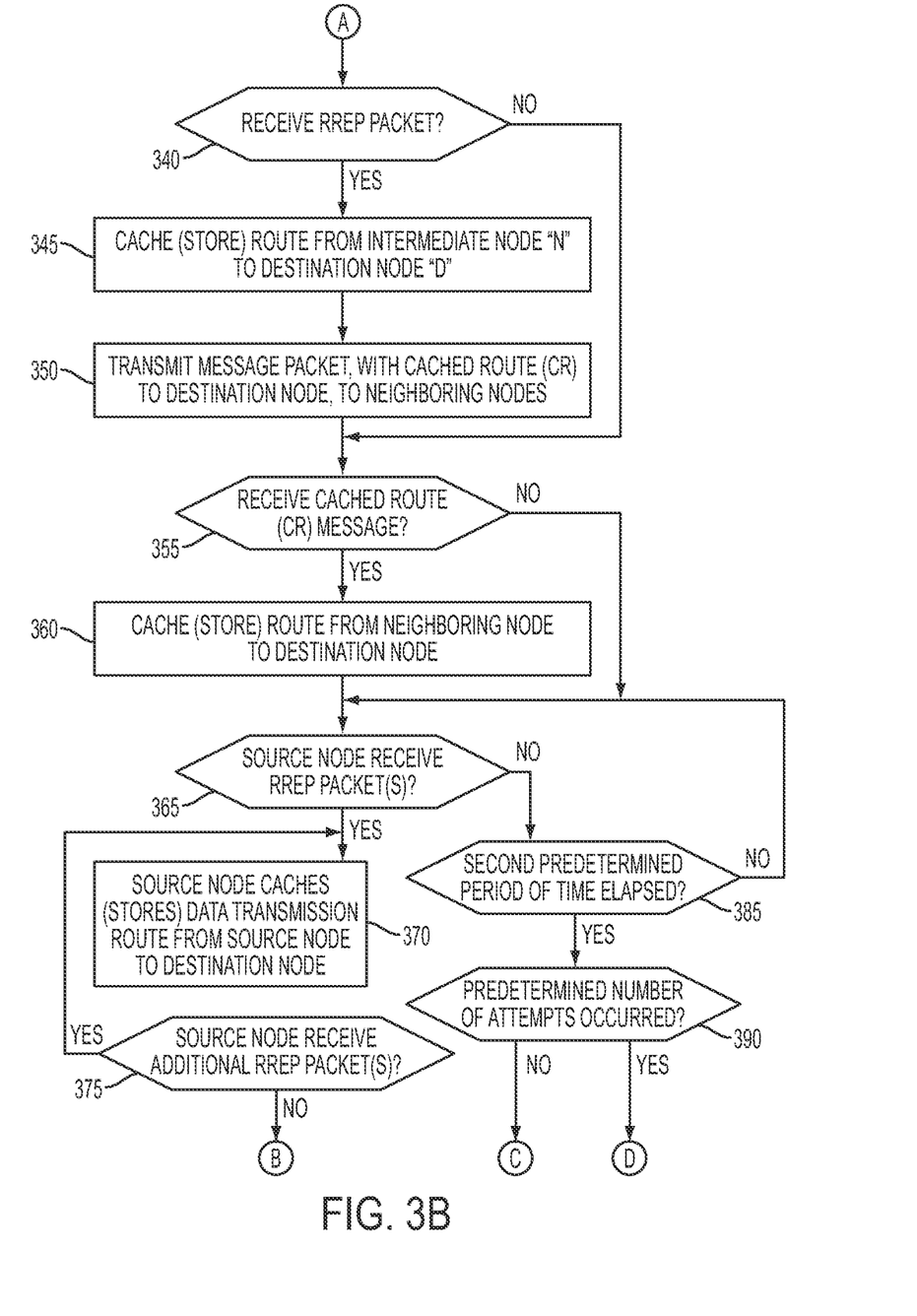
Figure 3C:
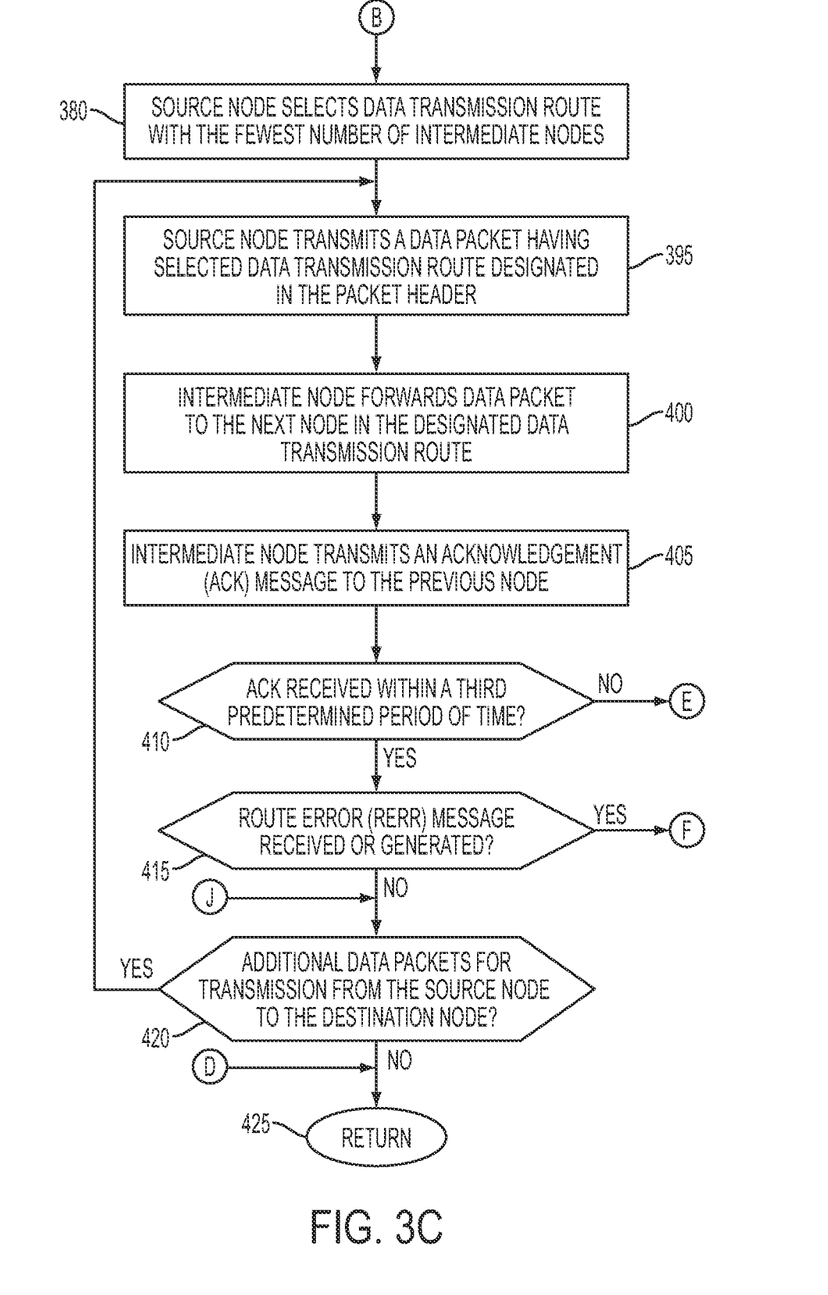

FIG. 3 is a flow chart diagram illustrating an exemplary or representative method for route discovery and data communication for a destination cached routing protocol for mobile ad hoc networks 175. Beginning with start step 300, a source node broadcasts a Route Request ("RREQ") packet having an address of the destination node (in addition to the source node address), step 305. In contrast with the prior art, instead of automatically appending its address and forwarding another RREQ packet, the intermediate node which receives a RREQ packet (step 310) transmits a Received Routing Request Message ("RCDM") packet to its neighboring nodes, step 315. While the RCDM packet contains sufficient information to inform the neighboring nodes concerning which RREQ packet was received by the node (such as source node and destination node addresses, and identification of the intermediate node which received the RREQ packet and sent the RCDM packet, for example and without limitation), the RCDM packet is considerably smaller (e.g., contains fewer bytes) than the RREQ packet, which contains addresses for each of the source, intermediate and destination nodes, growing in size as more intermediate nodes may be included in the route (and each appending its address). This RCDM packet is utilized to inform these neighboring nodes that the node sending the RCDM packet has received the RREQ packet and, as a result, does not need to receive another RREQ packet which may be forwarded from any of these neighboring nodes, reducing the number of RREQ packets which otherwise would be required in the mobile ad hoc network 175. Similarly, as described below, received RCDM packets from other nodes also indicates that these other nodes do not need to receive another RREQ packet from the intermediate node, further reducing the number of RREQ packets which otherwise would be required in the mobile ad hoc network 175. Furthermore, this RCDM packet also informs the source node that a RREQ packet has been received correctly, decreasing the need for the source node to transmit or re-transmit additional RREQ packets. This novel use of a comparatively smaller RCDM packet, instead of a RREQ packet, thereby serves to reduce network congestion. (It should be noted, however, that it is possible the RCDM packet may be more comparable in size to a RREQ packet which has appended only one intermediate node address.)

After waiting a first predetermined period of time, the intermediate node which has received the RREQ packet and has transmitted the RCDM packets to its neighboring nodes then determines whether it has received any RCDM packets from any nodes, step 320. When the intermediate node (or source node) has not received a RCDM packet from a neighboring node in step 320, only then does it appends its address in the packet header (in sequence, as the next data transmission link (node) from the previous link (node)) of the RREQ packet and forwards this RREQ packet to those nodes, step 325, or in the case of the source node, re-transmits a RREQ packet to those nodes (also step 325). Furthermore, in contrast with the prior art, when the intermediate node has received a RCDM packet from a neighboring node in step 320, the intermediate node does not append its address and does not forward the RREQ packet to those nodes from which it received an RCDM packet. As indicated above, a source node which has not received one or more RCDM packets (and/or RREP packets) after the first predetermined period of time may re-transmit one or more RREQ packets to the nodes from which it did not receive a RCDM packet) (or may re-initiate route discovery, either as part of steps 320 and 325, or by returning to step 305).

As the various RREQ packets traverse the mobile ad hoc network 175, one or more RREQ packets reach the node designated as the destination node in the RREQ packets. The destination node does not broadcast any of the RREQ packets further, and instead generates and transmits (unicasts) a Route Reply ("RREP") packet, step 330, for each RREQ packet received, step 335. Each RREP packet contains the reverse route of the RREQ packet, namely, the destination address, the addresses of all intermediate nodes which forwarded the RREQ packet, and the source address, in order from the destination node back to the source node. The destination node does not broadcast the RREP packets, and instead transmits each RREP packet to the selected intermediate node from which the destination node received the corresponding RREQ packet, also reducing network congestion.

As the various designated intermediate nodes receive a RREP packet, step 340, each such intermediate node "N" caches or otherwise stores the route from the intermediate node "N" to the destination node "D", step 345. In addition, each such intermediate node "N" transmits a Cached Route ("CR") message (packet) to its neighboring nodes containing this route from the intermediate node "N" to the destination node, step 350. When a node receives such a CR message, step 355, it updates and caches (stores) that route information, e.g., in a memory 210, step 360. (It should be noted that duplicate or otherwise similar routes typically are not cached in a node.) As a result, each such node has stored or cached the route information from its neighboring nodes to the destination node, and further may have stored or cached route information from itself (as an intermediate node included in the RREP packet) to the destination node.

As discussed in greater detail below with reference to FIG. 4, this novel Cached Route ("CR") message and the destination cached route stored in memory 210 of each of the intermediate and any neighboring nodes, is useful in the event of any data transmission link failure, further reducing network congestion and network overhead in the mobile ad hoc network 175 by reducing the need for additional route discovery following such a link failure. More particularly, upon such a link failure, the node may remove or erase from its route cache (in memory 210) any routes which contain the failed link, and may replace that failed route via one of the neighboring routes (provided in one or more CR messages). Accordingly, having cached various alternative data routes, data may travel faster through the mobile ad hoc network 175 without routing delays and without packet loss using the destination cached routing protocol of the present disclosure, even in the event of a date transmission link failure.

As the RREP packets traverse the mobile ad hoc network 175 and eventually reach the source node, step 365, the source node caches each route (also in reverse order) contained in the RREP packet, as a route from the source node to successive intermediate nodes to the destination node, step 370, and repeating this caching step (370) for each RREP packet received (step 375). The source node typically then selects the data transmission route involving the fewest number of intermediate nodes (i.e., the minimum number of hops) for data to be transmitted to the destination node, step 380. In the event the source node does not receive any RREP packets after a second predetermined period of time, steps 365 and 385, and if a predetermined number of route discovery attempts have not occurred, step 390, the method returns to step 305, for another route discovery attempt. (When a predetermined number of route discovery attempts have occurred, however, indicating the lack of a successful routing path to the destination node, such as due to the loss or exiting of nodes from the mobile ad hoc network 175, the method may end, return step 425.)

Following the route selection (step 380), the source node transmits a data packet having the entire selected data transmission route designated in the packet header, step 395. In turn, each intermediate node in the designated route forwards the data packet to the next node in the designated data transmission route, step 400, eventually reaching the destination node, and typically transmits a short acknowledgement ("ACK") message to the previous (intermediate or source) node from which it received the data packet, to indicate that it successfully received and forwarded the data packet, step 405. As long as an intermediate node has received an ACK message from the next node of the designated data transmission route (to which it forwarded the data packet) within a third predetermined period of time, step 410, and further has not received or generated a Route Error ("RERR") Message (packet) (step 415), the data transmission along the selected route will continue, returning to step 395, until there are no more data packets for transmission from the source node to the destination node, step 420, and the data transmission session may end, step 425.

Figure 4A:
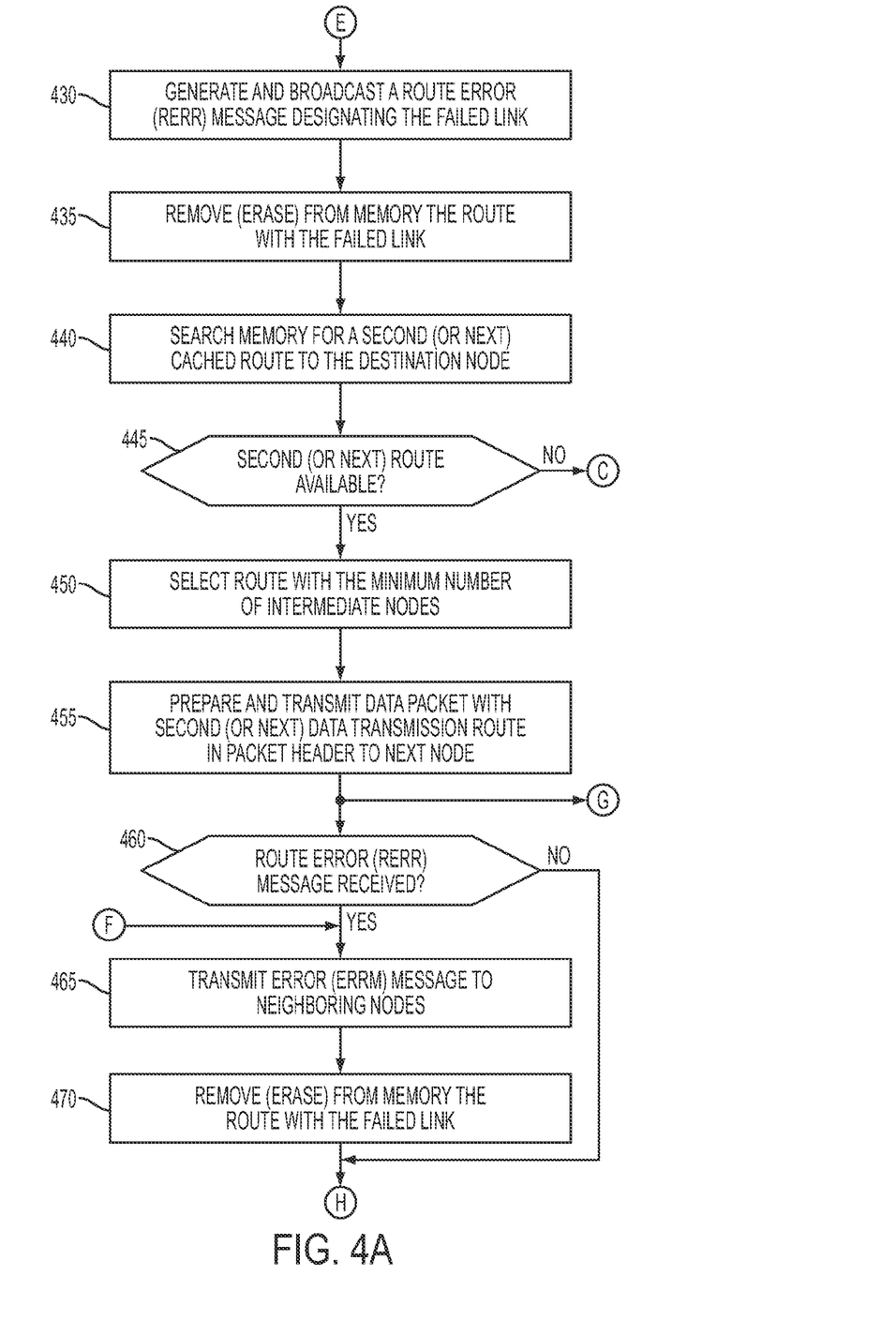
FIG. 4A and FIG. 4B, is a flow chart diagram illustrating an exemplary or representative method for route maintenance for a destination cached routing protocol for mobile ad hoc networks.
Figure 4B:
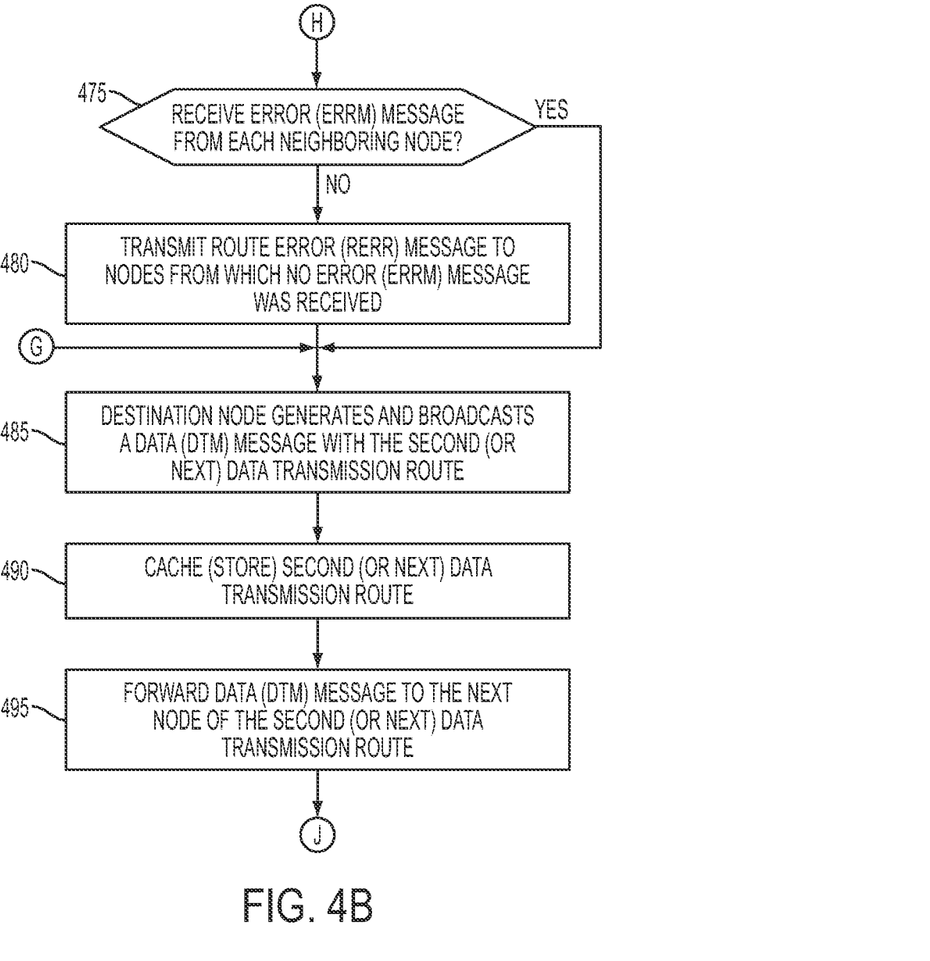

When an intermediate node has not received an ACK message from the next node of the designated data transmission route within the second predetermined period of time in step 410, the method commences with the route maintenance portion of the destination cached routing protocol of the present disclosure, commencing with step 430 illustrated in FIG. 4. Similarly, when a RERR Message is or has been received by an intermediate node or by the source node in step 415, the method also commences with the route maintenance portion of the destination cached routing protocol of the present disclosure, commencing with step 465 illustrated in FIG. 4.

FIG. 4 is a flow chart diagram illustrating an exemplary or representative method for route maintenance for a destination cached routing protocol for mobile ad hoc networks. Step 430 is initiated when an intermediate node has not received an ACK message from the next node of the designated data transmission route within the third predetermined period of time (step 410, FIG. 3). When such an ACK message has not been received, the intermediate node generates and broadcasts a Route Error (RERR) Message having the information for the failed link, such as the address of the node from which it did not receive the required ACK, step 430. The RERR message may also include additional information, such as the data path from the failed link to the destination node (the failed data transmission route), for example and without limitation. The intermediate node removes (erases) the failed data transmission route from its memory 210, step 435, and searches its memory 210 for a new, second (or next) route to the destination node, such as the various cached routes via its neighbors, step 440. When a second or next route is available, step 445, the intermediate node selects the route with the minimum number of additional nodes to reach the destination node (minimum number of hops), step 450, and prepares and sends the data packet having the second (or next) route information in the packet header to the next node of the second or next designated data transmission route, step 455. As a result, data packet transmission has continued without significant interruption and without data packet loss. Alternatively to inclusion of the second (or next) data transmission route in the data packet, this new route information may be included in a RERR Message, when available. When a second (or next) route is not available in step 445, new route discovery from the source node is initiated, returning to step 305 (FIG. 3).

When a RERR Message is received by a node of the mobile ad hoc network 175, step 460 (or step 415 of FIG. 3), such as by the various intermediate nodes following the RERR message broadcast of step 430, an intermediate node which received a RERR message transmits an Error ("ERRM") Message (packet) to its neighboring nodes, step 465, and in turn, each node which received an RERR message removes (erases) the failed data transmission route from its memory 210, step 470. This ERRM Message is utilized to inform these neighboring nodes that the node sending the ERRM Message has received the RERR Message and, as a result, does not need to receive another RERR Message which may be forwarded from any of these neighboring nodes, reducing the number of RERR Messages which otherwise would be required in the mobile ad hoc network 175. Similarly, as described below, received ERRM Messages from other nodes also indicates that these other nodes do not need to receive another RERR Message from the intermediate node, further reducing the number of RERR Messages which otherwise would be required in the mobile ad hoc network 175. As an ERRM Message is typically smaller (e.g., fewer bytes) than a RERR message, this also serves to reduce congestion in the mobile ad hoc network 175. The intermediate node which received the RERR Message, in turn, transmits the RERR Message to those other nodes from which it did not receive an ERRM Message within a fourth predetermined period of time, steps 475 and 480.

When a data packet with the second (or next) designated data transmission route was provided in step 455, and eventually reaches the destination node, the destination node generates and broadcasts a Data ("DTM") Message (packet), with the second (or next) designated data transmission route, step 485. Such a DTM Message may include the complete route from the source node to the destination node, or may include a partial route commencing with the intermediate node of the second (or next) route which was utilized to bypass the failed link. The various nodes which have received the new designated data transmission route information, either in a RERR Message or a DTM Message, will cache or otherwise store the second (or next) designated data transmission route, step 490, and will forward the data message with the second (or next) designated data transmission route to the next node (link) of the new designated data transmission route, step 495, and the method may return to step 420 (FIG. 3), for continued data packet transmission using the new designated data transmission route. This use of the destination cached routing protocol for mobile ad hoc networks of the present disclosure, when there is a failed data link, allows ongoing data communication, without significant interruption and lost data packets, and further without engaging in new route discovery when a cached alternative route is available.

Figure 5:
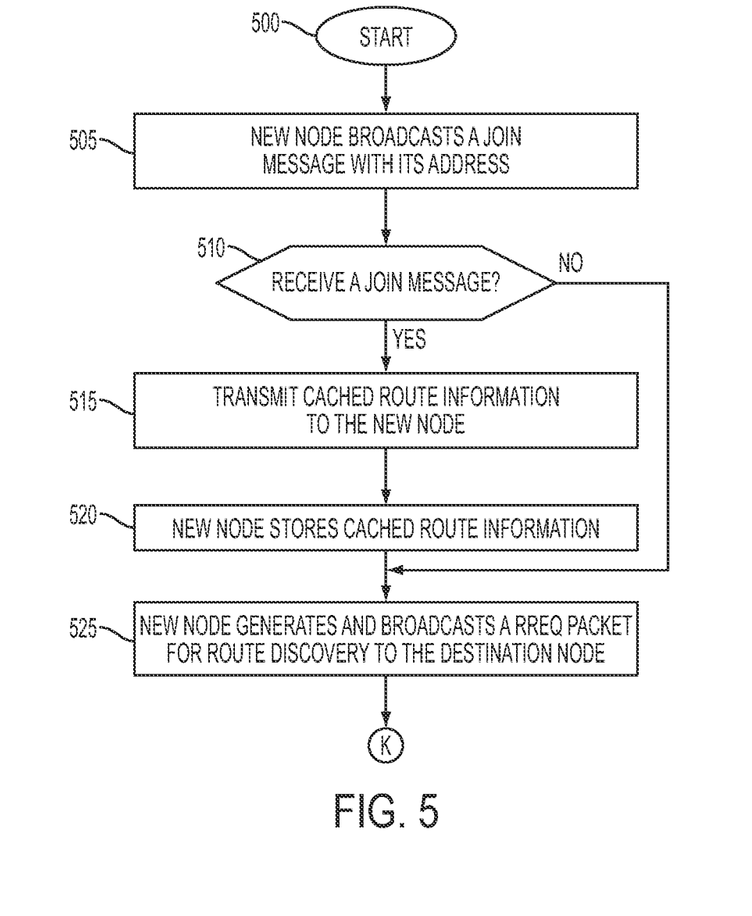
FIG. 5 is a flow chart diagram illustrating an exemplary or representative method for new node entry for a destination cached routing protocol for mobile ad hoc networks.

FIG. 5 is a flow chart diagram illustrating an exemplary or representative method for new node entry for a destination cached routing protocol for mobile ad hoc networks. As illustrated, when a new node enters the mobile ad hoc network 175, start step 500, the new node broadcasts a message or other packet, such as a join message, with its address, step 505. Other nodes which receive such a join message, step 510, such as neighboring nodes, transmit cached route information to the new node, step 515, such as the address of the destination node, and the new node in turn caches or otherwise stores the route information, step 520. The new node may also generate a RREQ packet to discover a route to the destination node, step 525, with the method returning to the route discovery portion of the destination cached routing protocol for mobile ad hoc networks of the present disclosure, step 310 (FIG. 3).

Numerous advantages of the present disclosure are readily apparent. The apparatus, method and system of the present disclosure provide a novel destination cached routing protocol for mobile ad hoc networks. The destination cached routing protocol of the present disclosure provides for an on-demand routing protocol for a mobile ad hoc network which reduces the potential for such network congestion. The destination cached routing protocol is also reasonably scalable, reliable, and efficient, thereby reducing routing overhead and reducing the likelihood of dropped or corrupted data packets. The destination cached routing protocol of the present disclosure further allows for ongoing data transmission in the event of a link failure, without undergoing an additional route discovery process, further reducing network congestion. This is especially significant as a mobile ad hoc network is highly dynamic, with nodes entering and leaving the network with reasonably frequency, while nonetheless allowing for ongoing data transmission without loss.

The present disclosure is to be considered as an exemplification of the principles of the invention and is not intended to limit the invention to the specific embodiments illustrated. In this respect, it is to be understood that the invention is not limited in its application to the details of construction and to the arrangements of components set forth above and below, illustrated in the drawings, or as described in the examples. Systems, methods and apparatuses consistent with the present invention are capable of other embodiments and of being practiced and carried out in various ways.

Although the invention has been described with respect to specific embodiments thereof, these embodiments are merely illustrative and not restrictive of the invention. In the description herein, numerous specific details are provided, such as examples of electronic components, electronic and structural connections, materials, and structural variations, to provide a thorough understanding of embodiments of the present invention. One skilled in the relevant art will recognize, however, that an embodiment of the invention can be practiced without one or more of the specific details, or with other apparatus, systems, assemblies, components, materials, parts, etc. In other instances, well-known structures, materials, or operations are not specifically shown or described in detail to avoid obscuring aspects of embodiments of the present invention. In addition, the various Figures are not drawn to scale and should not be regarded as limiting.

Reference throughout this specification to "one embodiment", "an embodiment", or a specific "embodiment" means that a particular feature, structure, or characteristic described in connection with the embodiment is included in at least one embodiment of the present invention and not necessarily in all embodiments, and further, are not necessarily referring to the same embodiment. Furthermore, the particular features, structures, or characteristics of any specific embodiment of the present invention may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

It will also be appreciated that one or more of the elements depicted in the Figures can also be implemented in a more separate or integrated manner, or even removed or rendered inoperable in certain cases, as may be useful in accordance with a particular application. Integrally formed combinations of components are also within the scope of the invention, particularly for embodiments in which a separation or combination of discrete components is unclear or indiscernible. In addition, use of the term "coupled" herein, including in its various forms such as "coupling" or "couplable", means and includes any direct or indirect electrical, structural or magnetic coupling, connection or attachment, or adaptation or capability for such a direct or indirect electrical, structural or magnetic coupling, connection or attachment, including integrally formed components and components which are coupled via or through another component.

Furthermore, any signal arrows in the drawings/Figures should be considered only exemplary, and not limiting, unless otherwise specifically noted. Combinations of components of steps will also be considered within the scope of the present invention, particularly where the ability to separate or combine is unclear or foreseeable. The disjunctive term "or", as used herein and throughout the claims that follow, is generally intended to mean "and/or", having both conjunctive and disjunctive meanings (and is not confined to an "exclusive or" meaning), unless otherwise indicated. As used in the description herein and throughout the claims that follow, "a", "an", and "the" include plural references unless the context clearly dictates otherwise. Also as used in the description herein and throughout the claims that follow, the meaning of "in" includes "in" and "on" unless the context clearly dictates otherwise.

The foregoing description of illustrated embodiments of the present invention, including what is described in the summary or in the abstract, is not intended to be exhaustive or to limit the invention to the precise forms disclosed herein. From the foregoing, it will be observed that numerous variations, modifications and substitutions are intended and may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. A method for a destination cached routing protocol for data transmission in a mobile ad hoc network, the method performed by a plurality of data processing apparatus as a plurality of nodes of the mobile ad hoc network, the method comprising:
using a source node, transmitting a routing request packet for a data transmission route from the source node to a destination node of the plurality of nodes;
when a routing request is received, using an intermediate node of the plurality of nodes, transmitting a received routing request message to neighboring nodes of the plurality of nodes;
using the intermediate node, appending the intermediate node address to the routing request packet and forwarding the routing request packet only to other nodes, of the plurality of nodes, from which a received routing request message was not received during a first predetermined period of time; using a destination node, for each route request packet received by the destination node, transmitting a route reply packet having a designated data transmission route between the source node and the destination node; and
transmitting a data packet, the data packet having the designated data transmission route in a packet header.

2. The method of claim 1, further comprising:
using a first intermediate node of the plurality of nodes, receiving at least one route reply packet; and
storing the designated data transmission route in a memory of the first intermediate node as a cached first data transmission route from the first intermediate node to the destination node.

3. The method of claim 2, further comprising:
using the first intermediate node, transmitting a cached route message to neighboring nodes of the plurality of nodes, the cached route message designating the first data transmission route from the first intermediate node to the destination node.

4. The method of claim 3, further comprising:
using a second intermediate node of the plurality of nodes, receiving the cached route message from the first intermediate node; and
storing the first data transmission route in a memory of the second intermediate node as a cached first data transmission route, from the first intermediate node to the destination node, of a plurality of cached data transmission routes to the destination node via a corresponding plurality of intermediate nodes of the plurality of nodes.

5. The method of claim 4, further comprising:
using the first intermediate node of the plurality of nodes, transmitting a data packet to a third intermediate node of the plurality of nodes, the third intermediate node designated in the first data transmission route;
when an acknowledgement message is not received from the third intermediate node, using the first intermediate node, transmitting a route error message; and
using the first intermediate node, searching the memory of the first intermediate node for a second data transmission route, of the plurality of cached data transmission routes, to the destination node via a neighboring node of the plurality of nodes.

6. The method of claim 5, further comprising:
appending the second data transmission route to the data packet; and
retransmitting the data packet having the second data transmission route in the packet header.

7. The method of claim 6, further comprising:
using the destination node, when a data packet is received having the second data transmission route in the packet header, broadcasting a data message with the second data transmission route.

8. The method of claim 7, further comprising:
for each intermediate node of the plurality of nodes, when a data message having the second data transmission route is received, removing the first data transmission route from a memory of the intermediate node, and storing the second data transmission route as a cached second data transmission route of the plurality of cached data transmission routes.

9. The method of claim 1, further comprising:
using an intermediate node, when a route error message is received, transmitting an error message to neighboring nodes; and
using the intermediate node, forwarding the route error message only to other nodes, of the plurality of nodes, from which an error message was not received during a second predetermined period of time.

10. The method of claim 9, wherein the error message is smaller than the route error message.

11. The method of claim 1, further comprising:
using the source node, receiving a plurality of route reply packets; and selecting a first designated data transmission route from the source node to the destination node, the first designated data transmission route having the fewest number of intermediate nodes of the plurality of nodes.

12. The method of claim 1, further comprising:
upon entry into the mobile ad hoc network, broadcasting a node address message to the plurality of nodes; and
when a node address is received, transmitting at least one cached route message to the node designated in the node address message.

13. The method of claim 12, further comprising:
when at least one cached route message is received, storing the corresponding data transmission route in a memory as a cached data transmission route of the plurality of cached data transmission routes to the destination node.

14. The method of claim 1, wherein the received routing request message is smaller than the routing request packet.

15. A data processing apparatus for destination cached routing protocol for data transmission in a mobile ad hoc network, the mobile ad hoc network comprised of a plurality of data processing apparatus as a plurality of nodes of the mobile ad hoc network, the data processing apparatus comprising:

a network input and output interface to receive and transmit data;

a memory to store data; and one or more processors to transmit a routing request packet for a data transmission route from a source node to a destination node of the plurality of nodes; when operating as an intermediate node of the plurality of nodes and a routing request is received, to transmit a received routing request message to neighboring nodes of the plurality of nodes, to append the intermediate node address to the routing request packet and forward the routing request packet only to other nodes, of the plurality of nodes, from which a received routing request message was not received during a first predetermined period of time; when operating as the destination node of the plurality of nodes and a route request packet is received, for each route request packet, to transmit a route reply packet having a designated data transmission route between the source node and the destination node; and to transmit a data packet, the data packet having the designated data transmission route in a packet header.

16. The apparatus of claim 15, wherein the one or more processors, when operating as a first intermediate node of the plurality of nodes and at least one route reply packet is received, further are to store the designated data transmission route in the memory as a cached first data transmission route from the first intermediate node to the destination node.

17. The apparatus of claim 16, wherein the one or more processors further are to transmit a cached route message to neighboring nodes of the plurality of nodes, the cached route message designating the first data transmission route from the first intermediate node to the destination node.

18. The apparatus of claim 17, wherein the one or more processors, when operating as a second intermediate node of the plurality of nodes and the cached route message from the first intermediate node is received, further are to store the first data transmission route in a memory as a cached first data transmission route, from the first intermediate node to the destination node, of a plurality of cached data transmission routes to the destination node via a corresponding plurality of intermediate nodes of the plurality of nodes.

19. The apparatus of claim 18, wherein the one or more processors, when operating as the first intermediate node of the plurality of nodes, further are to transmit a data packet to a third intermediate node of the plurality of nodes, the third intermediate node designated in the first data transmission route; when an acknowledgement message is not received from the third intermediate node, to transmit a route error message; and to search the memory for a second data transmission route, of the plurality of cached data transmission routes, to the destination node via a neighboring node of the plurality of nodes.

20. The apparatus of claim 19, wherein the one or more processors further are to append the second data transmission route to the data packet and retransmit the data packet having the second data transmission route in the packet header.

21. The apparatus of claim 20, wherein the one or more processors, when operating as the destination node and a data packet is received having the second data transmission route in the packet header, further are to broadcast a data message with the second data transmission route.

22. The apparatus of claim 21, wherein the one or more processors, when operating as an intermediate node of the plurality of nodes and a data message having the second data transmission route is received, further are to remove the first data transmission route from the memory, and store the second data transmission route as a cached second data transmission route of the plurality of cached data transmission routes.

23. The apparatus of claim 15, wherein the one or more processors, when operating as an intermediate node of the plurality of nodes and a route error message is received, further are to transmit an error message to neighboring nodes of the plurality of nodes; and to forward the route error message only to other nodes, of the plurality of nodes, from which an error message was not received during a second predetermined period of time.

24. The apparatus of claim 23, wherein the error message is smaller than the route error message.

25. The apparatus of claim 15, wherein the one or more processors, when operating as the source node and a plurality of route reply packets are received, further are to select a first designated data transmission route to the destination node, the first designated data transmission route having the fewest number of intermediate nodes of the plurality of nodes.

26. The apparatus of claim 15, wherein the one or more processors, upon entry into the mobile ad hoc network, further are to broadcast a node address message to the plurality of nodes; and when a node address is received, to transmit at least one cached route message to the node designated in the node address message.

27. The apparatus of claim 26, wherein the one or more processors, when at least one cached route message is received, further are to store the corresponding data transmission route in the memory as a cached data transmission route of the plurality of cached data transmission routes to the destination node.

28. The apparatus of claim 15, wherein the received routing request message is smaller than the routing request packet.

* * * * *